US009961200B1

(12) United States Patent
Kothuvatiparambil et al.

(10) Patent No.: US 9,961,200 B1
(45) Date of Patent: May 1, 2018

(54) DERIVED INTENT COLLISION DETECTION FOR USE IN A MULTI-INTENT MATRIX

(71) Applicant: Bank of America Corporation, Charlotte, NC (US)

(72) Inventors: Viju Kothuvatiparambil, Plano, TX (US); Emad Noorizadeh, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days. days.

(21) Appl. No.: 15/471,630

(22) Filed: Mar. 28, 2017

(51) Int. Cl.
| H04M 11/00 | (2006.01) |
| H04M 3/493 | (2006.01) |
| G10L 15/26 | (2006.01) |
| G10L 25/90 | (2013.01) |
| G10L 25/63 | (2013.01) |
| G10L 15/22 | (2006.01) |
| G06F 17/27 | (2006.01) |
| H04M 1/64 | (2006.01) |

(52) U.S. Cl.
CPC ...... *H04M 3/4936* (2013.01); *G06F 17/2785* (2013.01); *G10L 15/22* (2013.01); *G10L 15/265* (2013.01); *G10L 25/63* (2013.01); *G10L 25/90* (2013.01); *G06F 17/271* (2013.01); *G10L 2015/223* (2013.01)

(58) Field of Classification Search
CPC ....... G06F 17/279; G06Q 30/01; G10L 15/08; H04M 2201/40; H04M 2203/2038; H04M 3/5133
USPC ..................... 379/88.01–88.19; 704/246–252
See application file for complete search history.

(56) References Cited

U.S. PATENT DOCUMENTS

| 8,515,736 | B1 | 8/2013 | Duta |
| 8,611,675 | B2 | 12/2013 | Chow et al. |
| 8,688,453 | B1 * | 4/2014 | Joshi ............... G10L 15/00 704/10 |
| 8,712,773 | B2 | 4/2014 | Zheng et al. |
| 9,224,386 | B1 | 12/2015 | Weber |
| 2004/0153319 | A1 | 8/2004 | Yacoub |

(Continued)

OTHER PUBLICATIONS

"Parse Tree," Wikimedia Foundation, Inc., Jan. 13, 2017.

Primary Examiner — Solomon Bezuayehu
(74) Attorney, Agent, or Firm — Weiss & Arons LLP; Michael A. Springs, Esq.

(57) ABSTRACT

A method for utilizing a multi-intent matrix is provided. The method may be used to avoid a derived intent collision while determining correct intent of a human-voice-telephone query. The method may include receiving a telephone call at the voice response system. The method may include responding to the telephone call at the voice response system. The response may include prompting a human caller to utter a reason for the telephone call. The human caller may be associated with the telephone call. The method may include receiving a human-voice-telephone-query-utterance at the voice response system. The method may include translating the human-voice-telephone-query-utterance into a text string. The translating may occur at the voice response system or a translation module. The method may include analyzing the text string utilizing a group of parameters. The method may include re-analyzing the text string utilizing a group of parameters set to custom values.

27 Claims, 7 Drawing Sheets

(56) References Cited

U.S. PATENT DOCUMENTS

| | | | | |
|---|---|---|---|---|
| 2008/0243505 A1* | 10/2008 | Barinov | ............... | G10L 15/22 |
| | | | | 704/251 |
| 2014/0044243 A1* | 2/2014 | Monegan | ............ | H04M 3/493 |
| | | | | 379/88.01 |
| 2014/0365226 A1* | 12/2014 | Sinha | .................. | G10L 25/00 |
| | | | | 704/275 |
| 2015/0179165 A1* | 6/2015 | Mohamed | ............ | G06Q 30/01 |
| | | | | 704/251 |
| 2017/0195487 A1* | 7/2017 | Bellosi | .............. | H04M 3/5175 |

* cited by examiner

DERIVED INTENT COLLISION DETECTION FOR USE IN A MULTI-INTENT MATRIX

FIELD OF TECHNOLOGY

This invention relates to multi-intent matrices. More specifically, this invention relates to mitigating collisions between intents included in the matrices.

BACKGROUND OF THE DISCLOSURE

Many times, when a human caller telephones an entity, a voice response system responds to the call. The voice response system receives information from the caller. The information typically corresponds to a reason for the call. The voice response system prepares a response to the information. The voice response system presents the response to the caller.

Many times, the response does not satisfy the human caller. This may be because the response is inaccurate and does not sufficiently answer the reason for the call. It would be desirable to provide a method for utilizing a multi-intent matrix to minimize inaccurate, machine generated, responses presented to a human caller.

SUMMARY OF THE DISCLOSURE

A method for utilizing a multi-intent matrix is provided. The method may be used to avoid collisioning while determining correct intent of a human-voice-telephone query.

The method may include receiving a telephone call at a voice response system. The method may include responding to the telephone call at the voice response system. The response may include prompting a human caller to utter a reason for the telephone call. The human caller may be associated with the telephone call.

The method may include receiving a human-voice-telephone-query-utterance at the voice response system. The method may include translating the human-voice-telephone-query-utterance into a text string. The translating may occur at the voice response system. The translating may occur at a translation module.

The method may include analyzing the text string utilizing a group of parameters. Table A includes exemplary parameters.

TABLE A

| Exemplary parameters: |
| --- |
| a number of iterations utilized for review of the text string |
| a level of scrutiny utilized for review of grammar of the text string |
| a level of scrutiny utilized for review of punctuation of the text string |
| a recommended response time of the voice response system to the human-voice-telephone-query-utterance |
| a number of caller attempts, after which the voice response system is configured to route the human caller to a human representative associated with the voice response system |
| word order of the human-voice-telephone-query-utterance |
| parse structure of the human-voice-telephone-query-utterance |
| synonym information related to the human-voice-telephone-query-utterance |
| part of speech information of the human-voice-telephone-query-utterance |
| singular/plural noun information included in the human-voice-telephone-query-utterance |

In some embodiments, at least one of the group of parameters may be determined to be a hyper-parameter. The hyper-parameter, when set to higher than a threshold value, may reconfigure a structure of the text string. Such a reconfiguration may preferably enable the voice response system to correctly determine the meaning of the text string. The group of parameters may be adjusted to a set of default values.

Analyzing a text string may occur at the voice response system. The analyzing may include mapping the text string on the multi-intent matrix. The multi-intent matrix may include a plurality of query intents. The mapping may include analyzing the text string with respect to the plurality of query intents. The analyzing may be based on a probability of accuracy that the query intent reflects the intended intent associated with the text string.

The analyzing may include using the mapping to rank the plurality of intents with respect to the text string. The ranking may be used to obtain two highest-ranking query intents from the plurality of query intents. The two highest-ranking query intents may rank highest based on the probability of accuracy associated with each of the query intents. In some instances, the two highest-ranking intents may collide—i.e., the two highest-ranking intents may both by highly accurate but may implicate different intents. In some circumstances, while the intents may be different at a surface level, at a deeper level, the intents may be similar or even the same. (See below, FIG. 2, intent X and intent Y)

The method may include identifying a set of custom values for certain parameters associated with each of the two identified query intents. The set of custom values may be based on historic custom value information. The historic custom value information may be retrieved from a storage location. The identifying may occur at the voice response system.

The method may include altering parameter settings for one or both of the two highest-ranking intents at the voice response system based on the identified custom values.

The method may also include re-analyzing the text string utilizing the group of parameters as adjusted to the set of custom values. The re-analyzing may occur at the voice response system.

The re-analyzing may also include re-mapping the text string on the multi-intent matrix. The re-mapping may utilize the set of custom values. The re-mapping may be for re-analyzing the text string with respect to the two identified query intents. The re-analyzing may be based on the probability of accuracy that each of the identified query intents reflects the intended intent associated with the text string.

The re-analyzing may also include using the re-mapping to rank the two identified query intents. The ranking may be with respect to the text string. The ranking may be used to obtain one out of the two identified query intents that ranks higher, preferably, by a threshold amount, than the other identified intent.

The method may include retrieving and/or generating an audio answer. The audio answer may be associated with the higher-ranking query intent. The method may include presenting the retrieved audio answer to the human caller. The format of the presentation may be audio format or any other suitable format.

Each query intent may include a probability of accuracy. The probability of accuracy may be included within a predefined probability of accuracy band or window of possible correctness.

In some embodiments, the human caller is satisfied with the presented audio answer. In these embodiments, the method may include maintaining the custom values within the multi-intent matrix. In these embodiments, the method may also include, storing, within the multi-intent matrix, that the custom values were useful in determining a correct human-voice-telephone-query-utterance intent. The storing, and concomitant adjustment of the matrix, may increase a probability of accuracy that the custom values are correct when analyzing future human-voice-telephone-query-utterances.

In other embodiments, the human caller may be dissatisfied with the presented audio answer. In these embodiments, the method may include re-routing the human caller to a human representative. In these embodiments, the method may also include updating the custom values within the multi-intent matrix. The updated custom values may enable the voice response system to correctly determine a future human-voice-telephone-query-utterance intent. The updated custom values may be determined upon receipt of information. The receipt of information may be from the human representative. The receipt of information may be from a computer system associated with the human representative. The information may include a transcription of a request from the human caller as presented to the human representative. The information may also include an answer presented to the human caller that satisfied the human caller.

The method may determine that the human caller is dissatisfied with the audio answer because of a plurality of reasons. The reasons may include receiving an utterance from the human caller stating "go back" in response to the audio answer. The reasons may also include detecting a change in the human caller's voice in response to the audio answer. The reasons may also include detecting a change in the tone of the human caller's voice in response to the audio answer. The reasons may also include receiving an utterance from the human caller stating "representative" in response to the audio answer.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
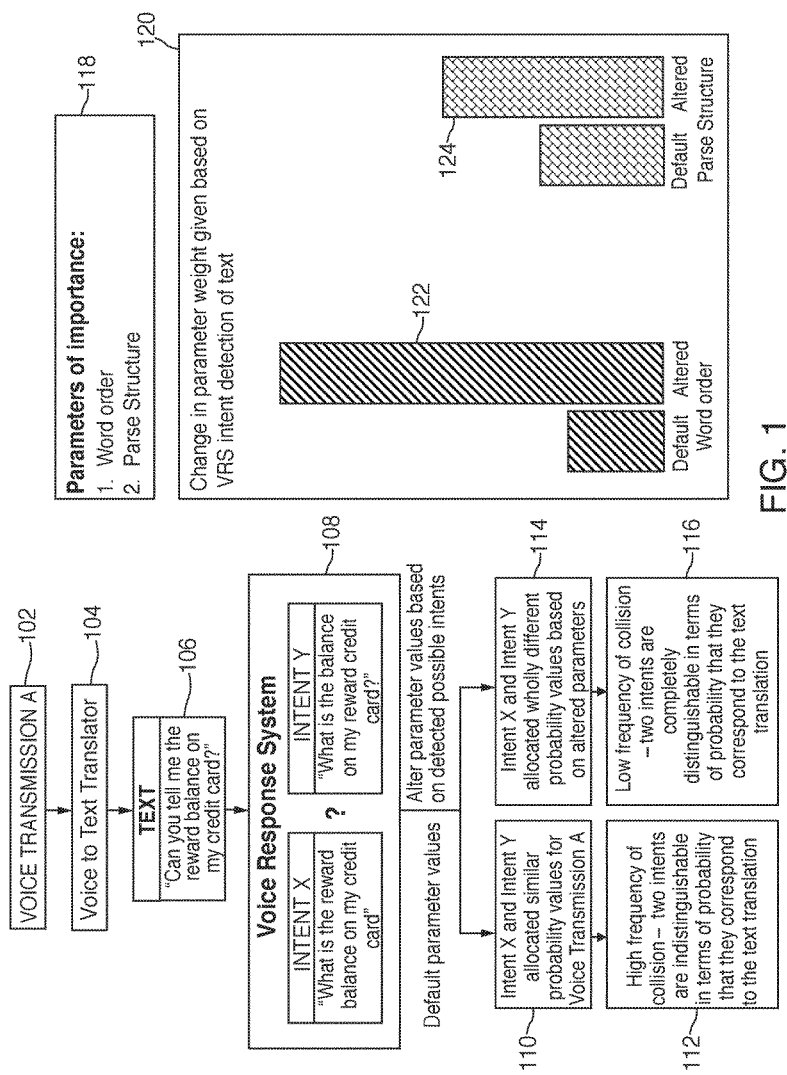
FIG. 1 shows an illustrative diagram according to certain embodiments.

A voice response system is provided. The voice response system may be configured to receive a telephone call. The voice response system may be configured to receive a plurality of telephone calls. Each telephone call may be initiated by a human caller. Each telephone call may relate to a query from the human caller who initiated the telephone call.

The voice response system may utilize a multi-intent matrix. The multi-intent matrix may be to select one answer, from a group of answers, to the query. The multi-intent matrix may enable the voice response system to provide an appropriate answer to the query. The selection of the answer may be used to avoid collisioning between answers stored in the multi-intent matrix. Collisioning may occur between answers with similar probabilities of accuracy. A probability of accuracy, associated with an answer, may be a percentage metric of whether the answer correctly corresponds to the human caller's query. Two answers with similar probabilities of accuracy, or that are associated with two similar bands of accuracy, may be characterized as being in collision.

In some embodiments, the multi-intent matrix may include a plurality of query intents, instead of, or in conjunction with, an answer to the query. In these embodiments, the multi-intent matrix may enable the voice response system to correctly determine the intent of the human caller's query. In these embodiments, collisioning may occur between intents with similar probabilities of accuracy. A probability of accuracy, as assigned to an intent, may be a percentage metric of whether the intent correctly represents the human caller's query. Two intents with similar probabilities of accuracy may be characterized as being in collision.

The apparatus may include a receiver. The receiver may be configured to receive a telephone call.

The apparatus may include a response unit. The response unit may be configured to respond to the telephone call at the voice response system. The response may include a prompt to a human caller. The human caller may be associated with the telephone call. The prompt may provoke the human caller to utter a reason for the telephone call.

The receiver may also be configured to receive a human-voice-telephone-query-utterance. The human-voice-telephone-query-utterance may be received from the human caller.

The apparatus may also include a translation module. The translation module may be configured to translate the human-voice-telephone-query-utterance into a text string.

The apparatus may also include a multi-intent matrix. The multi-intent matrix may include a plurality of query intents.

Table B shows an exemplary multi-intent matrix in an actual format. I1 through IN may be unique intents. The detected intent may be based on a user's input. The expected intent may be the correct intent. The value for each cell may be computed using equation A.

$$\text{Confusion} = \frac{t_{di}}{t_i} * 100 \qquad \text{Equation A}$$

The variable $t_{di}$ may be the number of tests for which an intent was incorrectly detected instead of the expected intent. The variable $T_i$ is the total number of tests corresponding to an expected intent. The confusion may be the percentage of incorrectly matched intents. The multi-intent matrix values may be defined as the collision metrics of the incorrectly detected intent as compared to the expected intent.

An example as shown in the multi-intent matrix may use I-1 as an incorrectly detected intent as compared to I-3 as an expected intent. There may be a 5.75 collision metric associated with intents detected as I-1 that in reality should have been defined as I-3. The 5.75 collision metric may be a percentage of incorrectly matched intents.

TABLE B

Multi-intent Matrix (Actual)

| Incorrectly Detected Intent | Expected Intent | | | | | | | | |
|---|---|---|---|---|---|---|---|---|---|
| | I-1 | I-2 | I-3 | I-4 | I-5 | I-6 | I-7 | I-8 | ... I-N |
| I-N | 0 | 0 | 0 | 0 | 0 | 0 | 0 | 0 | ... 0 |
| ... | ... | ... | ... | ... | ... | ... | ... | ... | ... |
| I-8 | 0 | 10.56 | 0 | 0 | 0 | 7.98 | 0 | 0 | ... 0 |
| I-7 | 2.12 | 0 | 0 | 6.75 | 0 | 0 | 0 | 0 | ... 0 |
| I-6 | 0 | 0 | 0 | 0 | 0 | 0 | 0 | 5.46 | ... 3.65 |
| I-5 | 0 | 0 | 20.45 | 0 | 0 | 0 | 14.93 | 0 | ... 0 |
| I-4 | 0 | 6.23 | 0 | 0 | 0 | 0 | 0 | 6.11 | ... 2.16 |
| I-3 | 8.23 | 5.43 | 0 | 0 | 5.23 | 3.74 | 8.56 | 0 | ... 0 |
| I-2 | 0 | 0 | 0 | 3.23 | 0 | 0 | 0 | 9.23 | ... 1.87 |
| I-1 | 0 | 0 | 5.75 | 0 | 0 | 0.16 | 0 | 0 | ... 0 |

Table C shows a multi-intent matrix in an ideal format. I1 through IN may be unique intents. The incorrectly detected intent may be based on a user's input. The expected intent may be the correct intent. The value for each cell may be computed using equation A. It should be appreciated that, all of the values are zero values indicating that there is virtually no error in an ideal multi-intent matrix.

TABLE C

Multi-intent matrix (Ideal)

| Incorrectly Detected Intent | Expected Intent | | | | | | | | |
|---|---|---|---|---|---|---|---|---|---|
| | I-1 | I-2 | I-3 | I-4 | I-5 | I-6 | I-7 | I-8 | ... I-N |
| I-N | 0 | 0 | 0 | 0 | 0 | 0 | 0 | 0 | ... 0 |
| ... | ... | ... | ... | ... | ... | ... | ... | ... | ... |
| I-8 | 0 | 0 | 0 | 0 | 0 | 0 | 0 | 0 | ... 0 |
| I-7 | 0 | 0 | 0 | 0 | 0 | 0 | 0 | 0 | ... 0 |
| I-6 | 0 | 0 | 0 | 0 | 0 | 0 | 0 | 0 | ... 0 |
| I-5 | 0 | 0 | 0 | 0 | 0 | 0 | 0 | 0 | ... 0 |
| I-4 | 0 | 0 | 0 | 0 | 0 | 0 | 0 | 0 | ... 0 |
| I-3 | 0 | 0 | 0 | 0 | 0 | 0 | 0 | 0 | ... 0 |
| I-2 | 0 | 0 | 0 | 0 | 0 | 0 | 0 | 0 | ... 0 |
| I-1 | 0 | 0 | 0 | 0 | 0 | 0 | 0 | 0 | ... 0 |

The apparatus may also include a processor module. The processor module may be configured to analyze the text string utilizing a group of parameters. Each parameter included in the group of parameters may be adjusted to a default set of values.

The processor module may also be configured to map the text string on the multi-intent matrix. The mapping may be with respect to the plurality of query intents included in the multi-intent matrix. The mapping may be based on a probability of accuracy that the query intent reflects the intended intent associated with the text string.

The processor module may also be configured to rank the plurality of intents with respect to the text string. The ranking may obtain two colliding query intents from the plurality of query intents. The two colliding query intents may rank highest based on the probability of accuracy associated with each of the query intents.

The processor module may also be configured to identify a set of custom values for certain parameters associated with each of the two identified query intents. The set of custom values may be based on historic custom value information. The historic custom value information may be stored for each of the two identified query intents.

The processor module may also be configured to alter the values of the group of parameters based on the identified custom values.

The processor module may also be configured to re-analyze the text string. The re-analyzing may use the group of parameters as adjusted to the set of custom values.

It should be appreciated that, in some embodiments, a combination set of custom values may be determined. The combination set of custom values may be a combination of the two sets of custom values relating to the two identified query intents. In these embodiments, the re-analyzing may utilize the group of parameters adjusted to the combination set of custom values.

The processor module may also be configured to re-map the text string on the multi-intent matrix. The re-mapping may use the group of parameters as adjusted to the set of custom values. The re-mapping may be based on the probability of accuracy associated with the text string.

The processor module may also be configured to rank the two identified query intents. The ranking may be performed after the re-analyzing. The ranking may be to obtain one out of the two identified intents that rank higher, preferably, by a threshold amount, than the other identified intent. The intent that ranks higher may correspond to the intent of the text string.

The processor module may also be configured to retrieve and/or generate an audio answer associated with the one of the two identified intents.

The response unit may be configured to present the retrieved audio answer to the human caller. The presenting may be done in an audio manner.

In some embodiments, the voice response system may include a multi-intent matrix. The multi-intent matrix may include a plurality of groups of indeterminate words. The multi-intent matrix may also include a plurality of parameters.

A voice query may be received at the voice response system. The voice response system may detect at least one of the plurality of groups of indeterminate words included in the voice query. The voice response system may be configured to alter at least one parameters associated with the detected group of indeterminate words. The altering may occur prior to responding to the voice query.

A method for responding to a human voice query received at a voice response system is provided. The method may include receiving the human voice query at the voice response system. The method may include translating the human voice query into a text query. The method may include determining whether the text query comprises at least one of the plurality of groups of indeterminate words. The plurality of groups of indeterminate words may be included in the multi-intent matrix. The multi-intent matrix may include the plurality of indeterminate words. The multi-intent matrix may also include a plurality of parameters associated with each of the indeterminate words. The method may include altering at least one parameters such that the meaning of the text query is changed. The altering may occur when the text query includes at least one of the plurality of indeterminate words. The method may include responding to the changed meaning of the text query. The method may include rerouting the text query to a human representative.

A method for altering parameters of a voice response system is provided. The altering may be done in response to receipt of a human voice query at the voice response system. The method may include receiving the voice query at the voice response system. The method may include attempting to determine an intent of the received voice query. The method may include selecting a reply to the determined intent. The method may include communicating the reply.

The method may include receiving input in response to the communicated reply. The input may include multi-intent information. The multi-intent information may indicate that the determined intent and the determined reply were processed incorrectly by the voice response system.

The method may include re-determining the intent of the voice query. The method may include identifying the root cause of the multi-intent information. The determination may occur in response to correctly determining the intent of the voice query. The cause of the multi-intent information may include a word or group of words. The multi-intent information may include a plurality of parameters.

The method may include arranging elements of information in a multi-intent matrix. The arranging may be based on the determined cause of the multi-intent. The elements of information may include the voice query. The elements of information may also include the determined intent of the received voice query. The elements of information may also include the communicated reply. The elements of information may also include the received input. The elements of information may also include the indeterminate word or group of words. The elements of information may also include the plurality of parameters. The elements of information may also include a set of parameters settings that would lower the probability of multi-intent associated with the word or group of words in a future human voice query. The elements of information may include any other suitable information.

In some embodiments, a second human voice query may be received. The second voice query may include the determined word, or group of words. The method may include altering parameter settings of the voice response system. A correct tuning of parameters may be helpful in obtaining the most suitable intent of a query.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram. Voice Transmission A, shown at 102, may be transmitted to a voice-to-text translator, shown at 104. The text shown at 106 may be the translation of voice transmission A. The text, shown at 106, may include "Can you tell me the reward balance on my credit card?"

Voice response system 108 may receive text 106. Voice response system 108 may compare the language of text 106 to a stored database of caller intents. The comparing may be in order to retrieve the intent that correctly corresponds to text 106. Voice response system 108 may retrieve intent X and intent Y. Voice response system 108 may have retrieved intents X and Y because of their respective similarity to text 106. The similarity determination may be based on a number of parameters. The parameters may include word count, choice of words, word order, singular/plural nouns, parse structure as well a variety of other parameters.

It should be appreciated that intent X—"What is the reward balance on my credit card?" and intent Y—"What is the balance on my reward credit card?" have two different meanings, although many of the words are the same. Therefore, a multi-intent matrix is included in voice response system 108. The multi-intent matrix may store a plurality of caller intents. The multi-intent matrix may also store an answer to each of the caller intents.

It should be appreciated that, using default parameters, voice response system 108 may allocate intent X and intent Y similar probability values for voice transmission A, as shown at 110. Upon allocating similar probability values to intent X and intent Y, there may be a high frequency of collision, as shown at 112, because the two intents may be substantially indistinguishable in terms of probability. Therefore, there is a high probability that an incorrect answer will be generated for the caller and/or presented to the caller.

It should be appreciated, that voice response system 408 may store custom values. The custom values may be assigned to parameters. Each intent included in the multi-intent matrix may be associated with a set of custom values. The custom values may change the amount of importance, or weight, assigned to specific parameters. The custom value may enable voice response system 108 to correctly determine the intent of voice transmission A.

Voice response system 108 may alter the parameter values upon identification of the retrieved intents. Using custom parameters, intent X and intent Y may be allocated wholly different probability values based on the altered parameters, as shown at 114. Using the altered parameter values, intent X and intent Y may be completely distinguishable in terms of probability. Therefore, there may be a low frequency of collision between intent X and intent Y, as shown at 116.

The parameters of importance, with respect to intent X and intent Y, and therefore the parameters to be changed, may include word order and parse structure, as shown at 118. The word order parameter may be important because intent X includes the key word "reward" before the key word "balance" and intent Y includes the key word "balance" before the key word "reward." The order of the key words may change the meaning of the complete meaning of the voice transmission. Increasing the importance of the word order, as shown at 122, within graph 120, may more clearly differentiate intent X from intent Y.

A parse structure parameter may be a syntactic structure of a text string according to grammar. A parse structure may be a syntactic structure of a sentence based on grammar. Parse structure may be important when differentiating between intent X and intent Y because "reward" modifies "balance" in intent X, and "reward" modifies "credit card"

in intent Y. Increasing the importance of the parse structure, as shown at 124, may more clearly differentiate intent X from intent Y.

Figure 2:
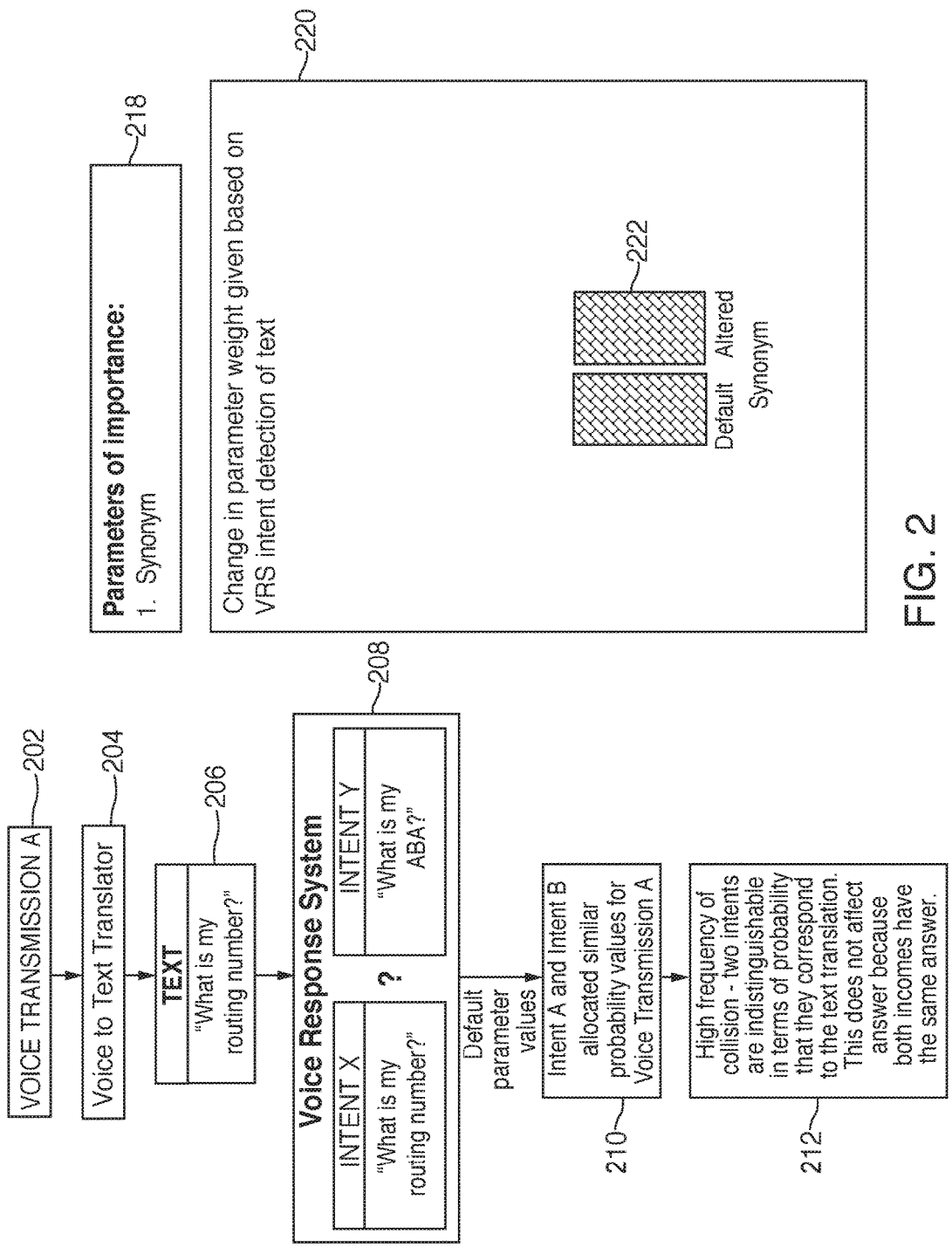
FIG. 2 shows an illustrative diagram according to certain embodiments.

FIG. 2 shows an illustrative diagram. Voice transmission A, shown at 202, may be transmitted to a voice-to-text translator, shown at 204. The text shown at 106 may be the translation of voice transmission A. The text, shown at 206, may include "What is my routing number?"

Voice response system 208 may receive text 206. Voice response system 208 may compare the language of text 206 to a stored database of caller intents. The comparing may be in order to retrieve the intent that correctly corresponds to text 206. Voice response system 208 may retrieve intent X and intent Y. Voice response system 208 may have retrieved intents X and Y because of their respective similarity to text 206. The similarity determination may be based on a number of parameters. The parameters may include word count, choice of words, word order, singular/plural nouns, parse structure, synonym information as well as a variety of other parameters.

It should be appreciated that intent X—"What is my routing number?" and intent Y—"What is my ABA?" have the same meaning, and are therefore allocated similar probability values as shown at 210. Upon allocating similar probability values to intent X and intent Y, there may be a high frequency of collision, as shown at 212. In this specific embodiment, the high frequency of collision does not affect the answer because both intents share the same answer.

The parameter of importance in this embodiment may be synonym information, as shown at 218. Synonym information may include information relating to different words with the same meanings. The parameter synonym may not require changing in this embodiment, as shown at 222 of graph 220.

Figure 3:
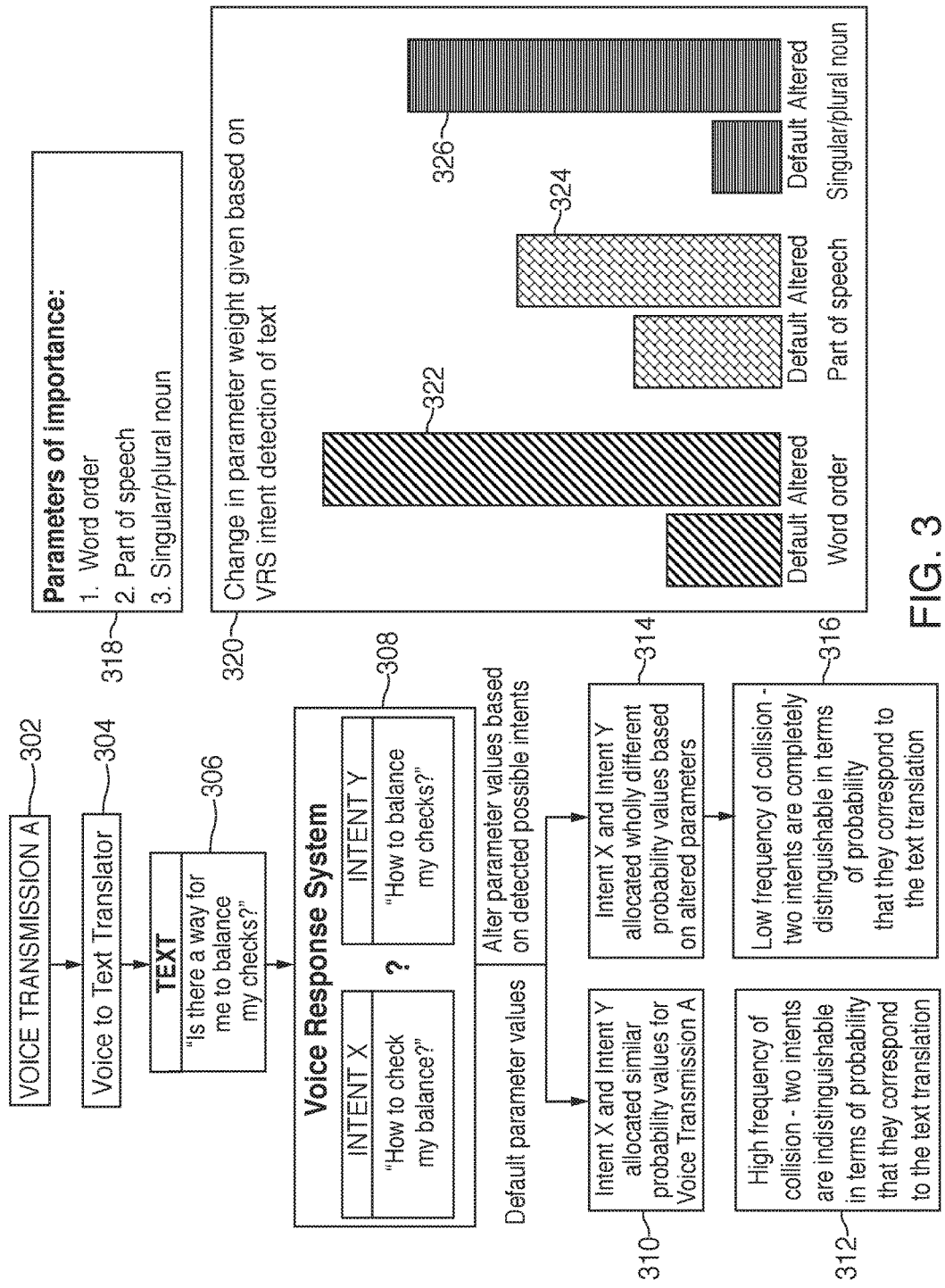
FIG. 3 shows an illustrative diagram according to certain embodiments.

FIG. 3 shows an illustrative diagram. Voice transmission A, shown at 302, may be transmitted to a voice-to-text translator, shown at 304. The text shown at 306 may be the translation of the voice transmission. The text, shown at 306, may include "Is there a way for me to balance my checks?"

Voice response system 308 may receive text 306. Voice response system 308 may compare the language of text 306 to a stored database of caller intents. The comparing may be in order to retrieve the intent that correctly corresponds to text 306. Voice response system may retrieve intent X and intent Y. Voice response system 308 may have retrieved intents X and Y because of their respective similarity to text 306. The similarity determination may be based on a number of parameters. The parameters may include word count, choice of words, word order, singular/plural nouns, parse structure, part of speech as well as a variety of other parameters.

It should be appreciated that intent X—"How to check my balance?" and intent Y—"How to balance my checks?" have two different meanings, although many of the words are the same. Therefore, a multi-intent matrix is included in voice response system 308. The multi-intent matrix may store a plurality of caller intents. The multi-intent matrix may also store an answer to each of the caller intents.

It should be appreciated that, using default parameters, voice response system 308 may allocate intent X and intent Y similar probability values for voice transmission A, as shown at 310. Upon allocating similar probability values to intent X and intent Y, there may be a high frequency of collision, as shown at 312, because the two intents may be indistinguishable in terms of probability. Therefore, there is a high probability that an incorrect answer will be generated for the caller or presented to the caller.

It should be appreciated, that voice response system 308 may store custom values. Each intent included in the multi-intent matrix may be associated with a set of custom values. The custom values may be assigned to parameters. The custom values may change the amount of importance, or weight, assigned to specific parameters. The custom values may enable voice response system 308 to correctly determine the intent of voice transmission A.

Voice response system 308 may alter the parameters values upon identification of the retrieved intents. Using custom parameters, intent X and intent Y may be allocated wholly different probability values based on the altered parameters, as shown at 314. Using the altered parameter values, intent X and intent Y may be completely distinguishable in terms of probability. Therefore, there may be a low frequency of collision between intent X and intent Y, as shown at 316.

The parameters of importance, with respect to intent X and intent Y, and therefore the parameters to be changed, may include word order, part of speech and singular/plural noun, as shown at 318. The word order parameter may be important because intent X includes the key word "check" before the key word "balance", while intent Y includes the key words in the reverse order. The order of the key words may change the complete meaning of the voice transmission. Increasing the importance of the word order, as shown at 322, included within graph 320, may more clearly differentiate intent X from intent Y.

The part of speech parameter may be important because intent X includes the word "check" as a verb while intent Y includes the word "checks" as a noun. The words may have a different meaning when being used as different parts of speech.

The singular/plural noun parameter may be important because intent X includes the word "check" in singular while intent Y includes the word "checks" in plural. The word "check" may have a different meaning than the word "checks."

Figure 4:
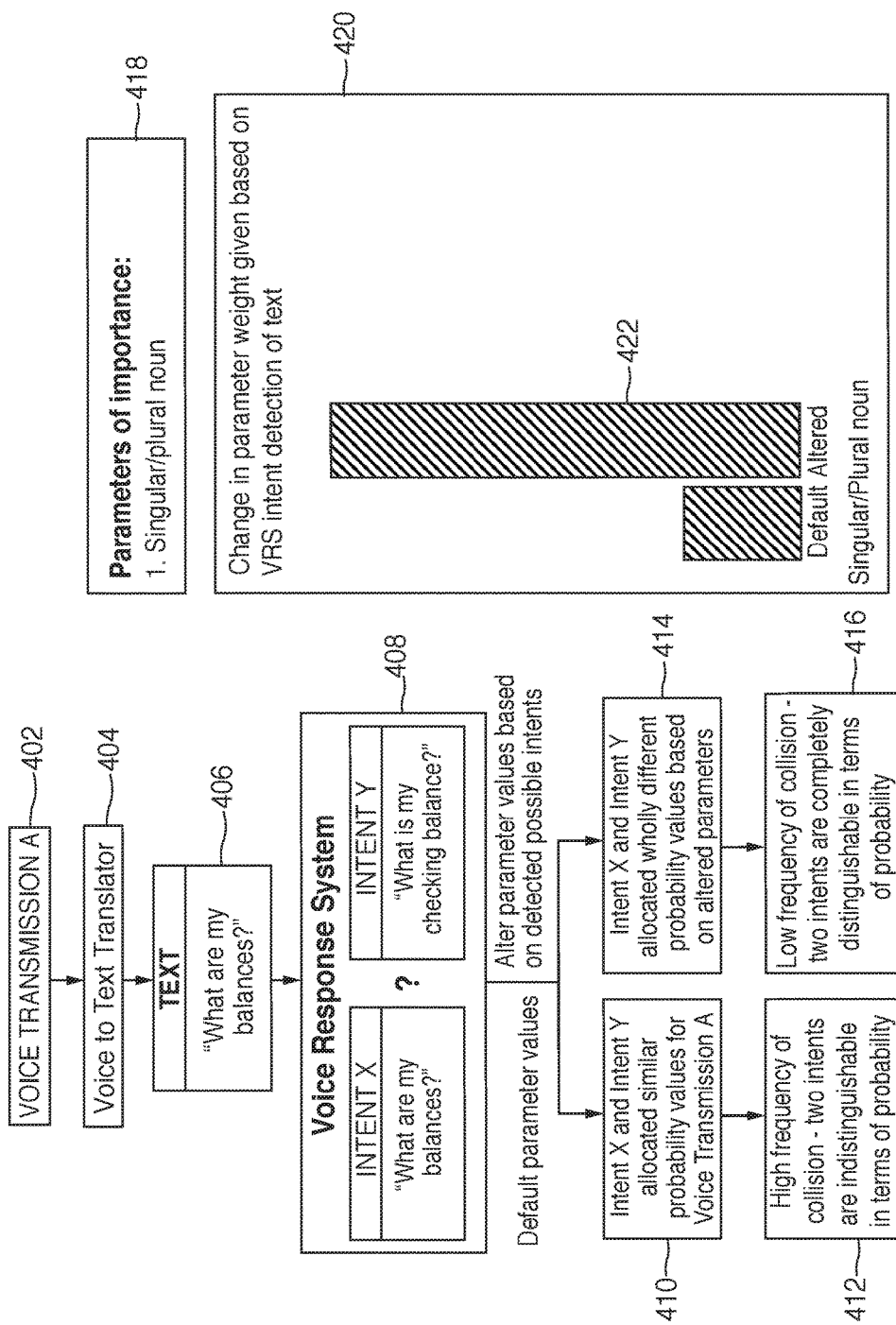
FIG. 4 shows an illustrative diagram according to certain embodiments.

FIG. 4 shows an illustrative diagram. Voice transmission A, shown at 402, may be transmitted to a voice-to-text translator, shown at 404. The text shown at 406 may be the translation of voice transmission A. The text, shown at 406, may include "What are my balances?"

Voice response system 408 may receive text 406. Voice response system 408 may compare the language of text 406 to a stored database of caller intents. The comparing may be in order to retrieve the intent that correctly correspond to text 406. Voice response system 408 may retrieve intent X and intent Y. Voice response system 408 may have retrieved intents X and Y because of their respective similarity to text 406. The similarity determination may be based on a number of parameters. The parameters may include word count, choice of words, word order, singular/plural nouns, parse structure as well as a variety of other parameters.

It should be appreciated that intent X—"What are my balances?" and intent Y—"What is my checking balance?" have two different meanings, although many of the words are the same. Therefore, a multi-intent matrix is included in voice response system 408. The multi-intent matrix may store a plurality of caller intents. The multi-intent matrix may also store an answer to each of the caller intents.

It should be appreciated that, using default parameters, voice response system 408 may allocate intent X and intent Y similar probability values for voice transmission A, as shown at 410. Upon allocating similar probability values to intent X and intent Y, there may be high frequency of collision, as shown at 412, because the two intents may be indistinguishable in terms of probability. Therefore, there is a high probability that an incorrect answer will be generated for the caller or presented to the caller.

It should be appreciated that voice response system 408 may store custom values. The custom values may be assigned to parameters. Each intent included in the multi-intent matrix may be associated with a set of custom values. The custom values may change the amount of importance, or weight, assigned to specific parameters. The custom value may enable voice response system 408 to correctly determine the intent of voice transmission A.

Voice response system 408 may alter the parameter values upon identification of the retrieved intents. Using custom parameters, intent X and intent Y may be allocated wholly different probability values based on the altered parameters, as shown at 414. Using the altered parameter values, intent X and intent Y may be completely distinguishable in terms of probability. Therefore, there may be a low frequency of collision between intent X and intent Y, as shown at 416.

The parameters of importance, with respect to intent X and intent Y, and therefore the parameters to be changed, may include singular/plural noun, as shown at 418. The singular/plural noun parameter may be important because intent X includes the word "balances" in plural while intent Y includes the word "balance" in singular. The singular/plural differentiation of the word "balance" may require multiple answers with respect to intent X and one answer with respect to intent Y. Increasing the importance of the singular/plural noun parameter, as shown at 422, within graph 420 may more clearly differentiate between intent X and intent Y.

Figure 5:
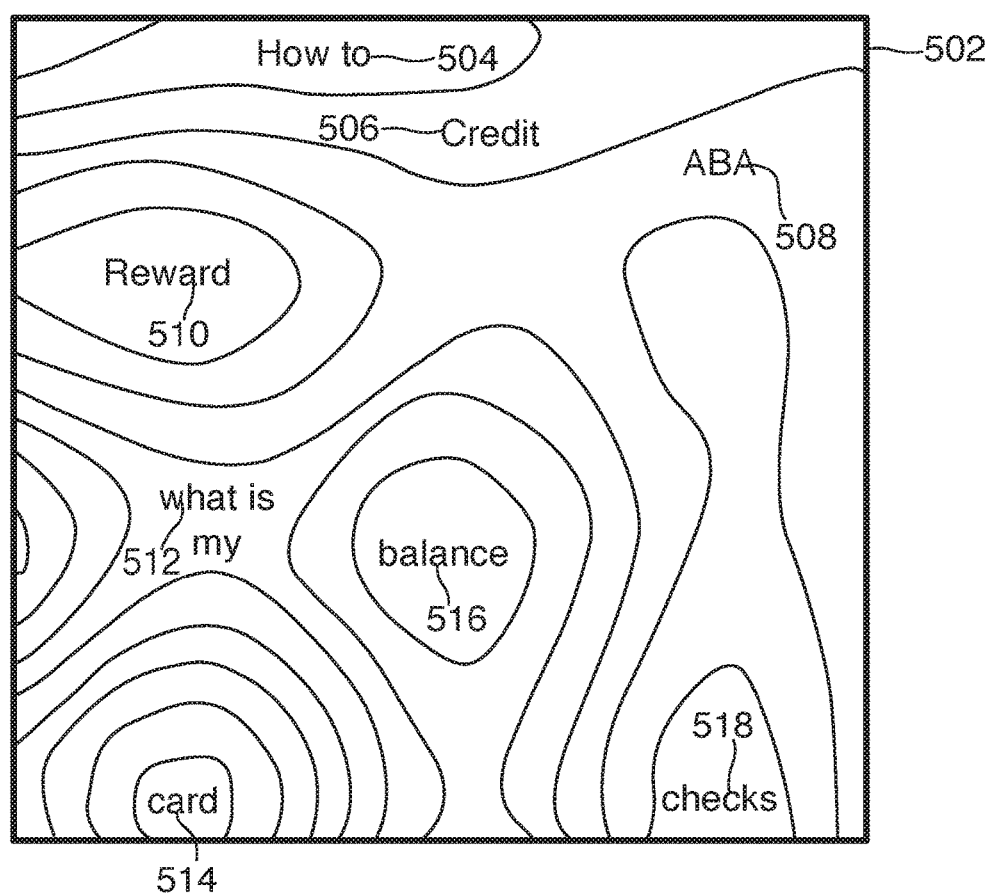
FIG. 5 shows an illustrative heatmap according to certain embodiments.

FIG. 5 shows sample heatmap 502 from a collection of numerous voice to text queries. Sample heatmap 502 may include a variety of words and/or phrases that are retrieved from numerous voice to text queries. The words or phrases in sections of the heatmap that are indicated by denser line formations are found in more queries than words or phrases found that are surrounded by less dense line formations. While the higher "heats" are indicated by denser line formations, it should be understood that ranging colors may be used to indicate higher levels of frequency of words and phrases. Table D shows exemplary words shown in heatmap 502, from a pool of 500 queries, the amount of times each of the words appears.

TABLE D exemplary words and amount of times they appear

| Exemplary word (lead line number) | Amount of times the word appears in a sample group of 500 queries |
|---|---|
| How To (504) | 326 |
| Credit (506) | 126 |
| ABA (508) | 112 |
| Reward (510) | 233 |
| What is my (512) | 178 |
| Card (514) | 433 |
| Balance (516) | 345 |
| Checks (518) | 234 |

It should be appreciated that heatmap 502 may be viewable on a graphical user interface ("GUI"). The GUI may be shown to an analyst. The analyst may assist in defining new indeterminate words based on heatmap 502.

In some embodiments, machine-learning algorithms may interpret heatmap 502 and define new indeterminate words based on heatmap 502 without ever presenting heatmap 502 to a human.

Figure 6A:
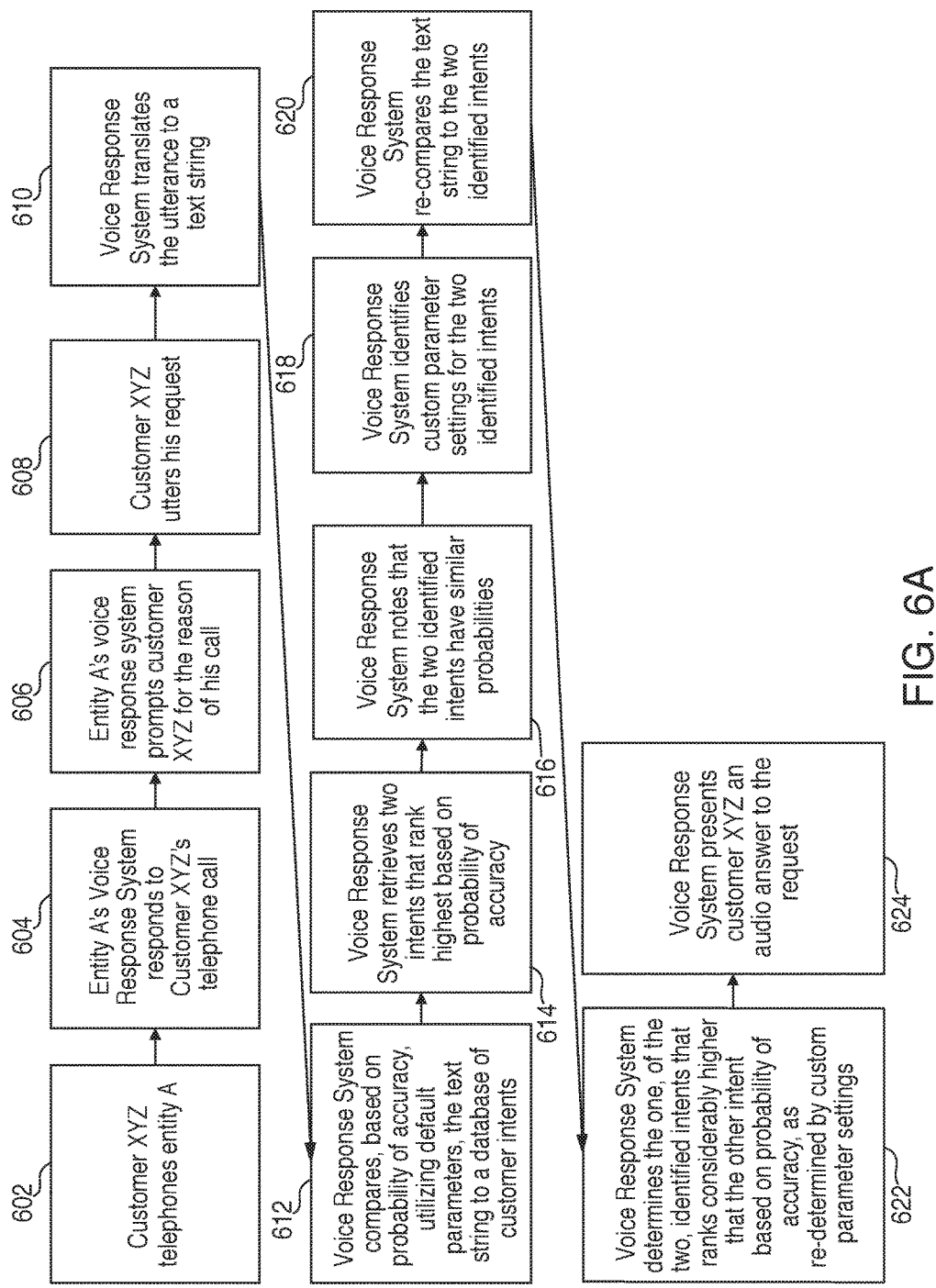
FIGS. 6A and 6B show an illustrative flow chart according to certain embodiments.
Figure 6B:
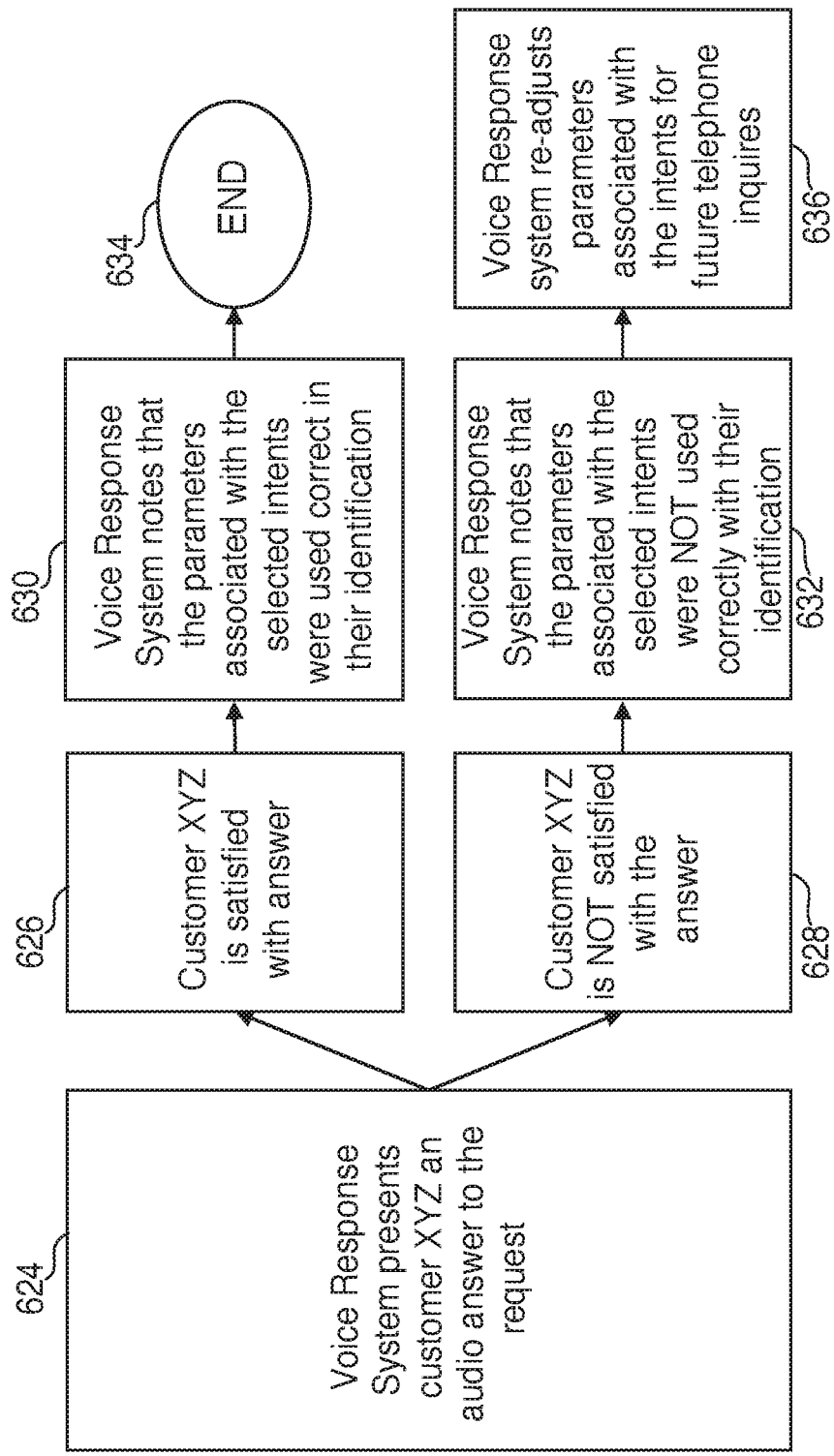

FIGS. 6A and 6B show a flow chart. Customer XYZ telephones entity A, as shown at 602. Entity A's voice response system responds to customer XYZ's telephone call, as shown at 604. Entity A's voice response system prompts customer XYZ for the reason of his call, as shown at 606.

Customer XYZ utters his request, as shown at 608. Voice response system translates the utterance to a text string, as shown at 610. Voice response system may compare the text string to a database of customer intents, as shown at 612. The comparing may be based on a probability of accuracy. The comparing may utilize default parameters.

The voice response system may retrieve two intents that rank highest based on a probability of accuracy, as shown at 614. The voice response system may note that the two identified intents have similar probabilities, as shown at 616. Therefore, the voice response system may identify custom parameter settings for the two identified intents, as shown at 618. The voice response system may then re-compare the text string to the two identified intents, as shown at 620.

The voice response system may determine that one of the two identified intents ranks higher than the other intent based on a probability of accuracy, as shown at 622. The voice response system may present customer XYZ an audio answer to the request, as shown at 624.

Upon receipt of the audio answer, customer XYZ may be satisfied with the answer, as shown at 626. Voice response system may note that the parameters associated with the selected intents were used correctly in their determination, as shown at 630. The process may end at 634.

At times, customer XYZ may not be satisfied with the answer, as shown at 628. Voice response system may note that the parameters associate with the selected intents were not used correctly with their identification, as shown at 632. The voice response system may re-adjust parameters associated with the intents for future telephone inquiries, as shown at 636.

Thus, methods and apparatus for collision detection and remediation for use with a multi-intent matrix have been provided. Persons skilled in the art will appreciate that the present invention can be practiced by other than the described embodiments, which are presented for purposes of illustration rather than of limitation. The present invention is limited only by the claims that follow.

What is claimed is:

1. A method for utilizing a multi-intent matrix for improving accuracy of avoiding a derived intent collision while determining correct intent of a human-voice-telephone query, the method comprising:
receiving a telephone call at a voice response system;
responding to the telephone call at the voice response system, said responding comprising prompting a human caller associated with the telephone call to utter a reason for the telephone call;
receiving a human-voice-telephone-query-utterance at the voice response system;
translating the human-voice-telephone-query-utterance into a text string at the voice response system;
analyzing, at the voice response system, the text string, said analyzing utilizing a group of parameters adjusted to a set of default values, said analyzing further comprising:
mapping the text string on the multi-intent matrix, said multi-intent matrix comprising a plurality of query intents, said mapping for analyzing the text string with respect to the plurality of query intents based on a probability of accuracy that the query intent reflects the intended intent associated with the text string; and using said mapping to rank the plurality of intents with respect to the text string to obtain two colliding query intents, from the plurality of query intents, that rank highest based on the probability of accuracy associated with each of the query intents;

identifying, at the voice response system, a set of custom values for each of the two identified query intents, said set of custom values being based on historic custom value information stored for each of the two identified query intents;

altering parameter settings at the voice response system based on the identified custom values;

re-analyzing, at the voice response system, the text string, said re-analyzing utilizing the group of parameters adjusted to the set of custom values, said re-analyzing comprising:

re-mapping the text string on the multi-intent matrix, said re-mapping utilizing the set of custom values, said re-mapping for analyzing the text string with respect to the two identified query intents based on the probability of accuracy that each of the identified query intent reflects the intended intent associated with the text string;

using said re-mapping to rank the two identified query intents with respect to the text string to obtain one out of the two identified query intents that ranks higher, by a threshold amount, than the other identified intent, as re-analyzed utilizing the set of custom values;

retrieving an audio answer associated with the one of the two identified intents; and presenting the retrieved audio answer in audio manner to the human caller.

2. The method of claim 1, wherein each of the intents includes a probability of accuracy within a predefined probability of accuracy band.

3. The method of claim 1, wherein, when, in response to the presenting the retrieved audio answer to the human caller, the human caller is satisfied with the audio answer, the method further comprises:

maintaining the custom values within the multi-intent matrix; and noting, within the multi-intent matrix, that the custom values were useful in determining a correct human-voice-telephone-query-utterance intent, thereby raising a probability of accuracy that the custom values are correct when analyzing future human queries.

4. The method of claim 1, wherein, when, in response to the presenting the retrieved audio answer to the human caller, the human caller is dissatisfied with the audio answer, the method further comprises:

re-routing the caller to a human representative; and
updating the custom values within the multi-intent ma x.

5. The method of claim 4, wherein the voice response system determines that the human caller is dissatisfied with the audio answer because of a reason selected from the group consisting of:

the human caller uttered "go back" in response to the audio answer;

the pitch of the human caller's voice was raised in response to the audio answer;

the tone of the human caller's voice was changed in response to the audio answer; or the human caller uttered "representative" in response to the audio answer.

6. The method of claim 1, wherein the group of parameters includes a number of iterations utilized for review of the voice query.

7. The method of claim 1, wherein the group of parameters includes a level of scrutiny utilized for review of grammar of the text string.

8. The method of claim 1, wherein the group of parameters includes a level of scrutiny utilized for review of punctuation of the text string.

9. The method of claim 1, wherein the group of parameters includes a recommended response time of the voice response system to the human-voice-telephone-query-utterance.

10. The method of claim 1, wherein the group of parameters includes a number of caller attempts after which the voice response system is configured to route the human caller to a human representative associated with the voice response system.

11. The method of claim 1, wherein at least one of the group of parameters is determined to be a hyper-parameter, said hyper-parameter, when set to higher than a threshold value for reconfiguring a structure of the text string such that the voice response system correctly determines the meaning of the text string.

12. The method of claim 1, wherein the group of parameters includes word order of the human-voice-telephone-query-utterance.

13. The method of claim 1, wherein the group of parameters includes parse structure of the human-voice-telephone-query-utterance.

14. The method of claim 1, wherein the group of parameters includes synonym information related to the human-voice-telephone-query-utterance.

15. The method of claim 1, wherein the group of parameters includes part of speech information of the human-voice-telephone-query-utterance.

16. The method of claim 1, wherein the group of parameters includes singular/plural noun information included in the human-voice-telephone-query-utterance.

17. A voice response system which utilizes a multi-intent matrix for improving accuracy of avoiding derived intent collision while determining correct intent of a human-voice-telephone query, the voice response system comprising:

a receiver configured to receive a telephone call;
a response unit configured to respond to the telephone call at the voice response system, said response comprising a prompt to a human caller, said human caller being associated with the telephone call, said prompt for provoking the human caller to utter a reason for the telephone call;

the receiver further configured to receive:
a human-voice-telephone-query-utterance;
a translation module configured to:
translate the human-voice-telephone-query-utterance into a text string;
the multi-intent matrix comprising:
a plurality of query intents;
a processor module configured to:
analyze the text string utilizing a group of parameters, said parameters being adjusted to a default set of values;
map the text string on the multi-intent matrix with respect to the plurality of query intents, included in the multi-intent matrix, based on a probability of accuracy that the query intent reflects the intended intent associated with the text string;

rank the plurality of intents with respect to the text string to obtain two colliding query intents, from the plurality of query intents, that rank highest based on the probability of accuracy associated with each of the query intents;

identify a set of custom values for each of the two identified query intents, said set of custom values being based on historic custom value information stored for each of the two identified query intents;

alter parameter setting based on the identified custom values;

re-analyze the text string utilizing the group of parameters adjusted to the set of custom values;

re-map the text string on the multi-intent matrix utilizing the group of parameters adjusted to the set of custom values with respect to the two identified query intents based on the probability of accuracy that each of the identified query intents reflects the intended intent associated with the text string;

rank the two identified query intents with respect to the text string to obtain one out of the two identified query intents that ranks higher, by a threshold amount, than the other identified intent, as re-analyzed using the set of custom values; and retrieve an audio answer associated with the one of the two identified intents; and the response unit further configured to present the retrieved audio answer in audio manner to the human caller.

18. The voice response system of claim 17, wherein each of the two query intents includes a probability of accuracy within a predefined probability of accuracy band.

19. The voice response system of claim 17, wherein, when in response to the response unit presenting the retrieved audio answer to the human caller, the human caller is satisfied with the audio answer, the processor is further configured to:

maintain the custom values within the multi-intent matrix;

note, within the multi-intent matrix, that the custom values were useful in determining a correct human caller intent, thereby raising a probability of accuracy that the custom values are correct when analyzing future human queries.

20. The voice response system of claim 17, wherein, when, in response to the response unit presenting the audio answer to the human caller, the human caller is dissatisfied with the audio answer, the processor is further configured to:

re-route the human caller to a human representative; and update the custom values within the multi-intent matrix.

21. The voice response system of claim 20, wherein the voice response system determines that a human caller is dissatisfied with the audio answer because of a reason selected from the group consisting of:

the human caller said "go back" in response to the audio answer;

the pitch of the human caller's voice was raised in response to the audio answer;

the tone of the human caller's voice was changed in response to the audio answer; or the human caller said "representative" in response to the audio answer.

22. The voice response system of claim 17, wherein the group of parameters include a number of iterations utilized for review of the voice query.

23. The voice response system of claim 17, wherein the group of parameters includes a level of scrutiny utilized for review of grammar of the voice query.

24. The voice response system of claim 17, wherein the group of parameters includes a level of scrutiny utilized for review of punctuation of the voice query.

25. The voice response system of claim 17, wherein the group of parameters includes a recommended response time of the voice response system to the human query.

26. The voice response system of claim 17, wherein the group of parameters includes a number of caller attempts after which the response unit is configured to route the voice query to a human representative associated with the voice response system.

27. The voice response system of claim 17, wherein at least one of the group of parameters is determined to be a hyper-parameter, said hyper-parameter, when set to higher than a threshold value, reconfigures a structure of the voice query such that the voice response system correctly determines the meaning of the voice query.

* * * * *